US011535104B2

(12) United States Patent
Hu et al.

(10) Patent No.: US 11,535,104 B2
(45) Date of Patent: Dec. 27, 2022

(54) TRAIN AND TRAIN POWER SUPPLY CONTROL METHOD

(71) Applicant: CRRC TANGSHAN CO., LTD., Hebei (CN)

(72) Inventors: Yang Hu, Tangshan (CN); Wenchao Fu, Tangshan (CN); Lei Liu, Tangshan (CN); Yongmei Fan, Tangshan (CN); Chunxing Pei, Tangshan (CN); Shaojing Sun, Tangshan (CN); Liping Zhang, Tangshan (CN); Hua Shi, Tangshan (CN); Ruimei Wu, Tangshan (CN); Ying Li, Tangshan (CN); Yuanyuan Shuai, Tangshan (CN); Jingyuan Li, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 212 days.

(21) Appl. No.: 16/627,323

(22) PCT Filed: Jun. 29, 2018

(86) PCT No.: PCT/CN2018/093650
§ 371 (c)(1),
(2) Date: Dec. 29, 2019

(87) PCT Pub. No.: WO2019/100720
PCT Pub. Date: May 31, 2019

(65) Prior Publication Data
US 2021/0155095 A1 May 27, 2021

(30) Foreign Application Priority Data
Nov. 21, 2017 (CN) .......................... 201711164097.X

(51) Int. Cl.
*B60L 1/00* (2006.01)
*B60L 15/32* (2006.01)

(52) U.S. Cl.
CPC ............... *B60L 1/003* (2013.01); *B60L 15/32* (2013.01); *B60L 2200/26* (2013.01); *B60L 2210/40* (2013.01); *B60L 2240/547* (2013.01)

(58) Field of Classification Search
None
See application file for complete search history.

(56) References Cited

U.S. PATENT DOCUMENTS 2,563,571 A    8/1951  Woods
8,274,180 B2 * 9/2012  Homma ................ B61L 25/028
                                                307/115

(Continued)

FOREIGN PATENT DOCUMENTS

CN    101590816 A    12/2009
CN    102398531 A    4/2012

(Continued)

OTHER PUBLICATIONS

Supplementary European Search Report in the European application No. 18880760.6, dated Nov. 3, 2020.

(Continued)

*Primary Examiner* — Todd Melton
(74) *Attorney, Agent, or Firm* — Syncoda LLC; Feng Ma

(57) ABSTRACT

A train, comprising a train formation consisting of a head car, a power car and an intermediate car, end walls of the head car, power car and intermediate car having thereon oppositely disposed connectors 2 extending perpendicular to a direction of travel of the train; all connectors 2 on the end walls of the train are connected by means of wiring; the head car, power car and intermediate car connect electric power wiring of the whole train by means of the connectors when (Continued)

in any formation state; the train has disposed thereon two parallel power supply wires penetrating the entire train and multiple auxiliary power supply systems. The present invention can decrease different voltage standard conversion equipment of a multiple unit, lowering in-vehicle equipment costs.

16 Claims, 5 Drawing Sheets

(56) References Cited

U.S. PATENT DOCUMENTS

| | | | |
|---|---|---|---|
| 9,533,632 B2* | 1/2017 | Bangtsson | H02M 7/5387 |
| 2017/0240187 A1 | 8/2017 | Shubs, Jr. et al. | |

FOREIGN PATENT DOCUMENTS

| | | |
|---|---|---|
| CN | 203697972 U | 7/2014 |
| CN | 104554300 A | 4/2015 |
| CN | 105059310 A | 11/2015 |
| CN | 103318193 B | 12/2015 |
| CN | 103935246 B | 12/2015 |
| CN | 105438222 A | 3/2016 |
| EP | 0711697 A1 | 5/1996 |
| EP | 2420427 A2 | 2/2012 |
| JP | 2000344101 A | 12/2000 |
| WO | 2012174382 A1 | 12/2012 |

OTHER PUBLICATIONS

Yu Dandan etc., "Optimization method for train plan of urban rail transit based on the flexible length of train formation", <Journal of Beijing Jiaotong University> vol. 39 No. 6, issued on Dec. 15, 2021.
Xiong Li, "Practice of variable configuration of EMU in Beijing-Tianjin-Hebei region", <Modern Urban Transit (08)>, issued on Aug. 31, 2017.
International Search Report in the international application No. PCT/CN2018/093650, dated Sep. 28, 2018.
English translation of the Written Opinion of the International Search Authority in the international application No. PCT/CN2018/093650, dated Sep. 28, 2018.

* cited by examiner

TRAIN AND TRAIN POWER SUPPLY CONTROL METHOD

CROSS-REFERENCE TO RELATED APPLICATIONS

This application is a 35 U.S.C. 371 national stage filing of International Application No. PCT/CN2018/093650 filed Jun. 29, 2018, which claims priority to Chinese Patent Application No. 201711164097.X filed Nov. 21, 2017. The entire contents of these above patent applications are hereby incorporated by reference in their entirety.

TECHNICAL FIELD

The present disclosure relates to the technology of rail transit, in particular to a train and a power supply control method for a train.

BACKGROUND

The current Electrical Multiple Unit (EMU) in our country is mainly of 8-car formation, and runs in a coupled running mode of 8-car formation, 16-car formation and two 8-car formations. However, the current formation mode of the EMU is fixed, that is to say, the position and direction of each car in a whole train are prescriptive when the car is designed, the formation type cannot be changed, and the number of cars included in the train cannot be changed too.

In the process of designing a train, after an arrangement manner of cars is determined, the arrangement manner of each car cannot be changed during train formation at any time thereafter, that is to way, the positions of the first end and the second end of the car cannot be reversed during arrangement; if the sequence of each carriage is changed or the carriage is reversed 180 degrees, the car will be unable to be connected or will perform actions wrongly.

As illustrated in FIG. 1, an auxiliary power supply system of the current EMU consists of an intermediate DC circuit of a traction converter, a single Auxiliary Converter Unit (ACU), a Double-Auxiliary Converter Unit (D-ACU), a charger, a battery, an assist and control electrical device, a ground power supply and on the like. The assist and control electrical device includes various AC and DC electrical devices. The single ACU is installed under a transformer car (TC07/TC02), and the D-ACU is installed under a first-class car (FC05) and a dining car (BC04). The charger and the battery are installed under the first-class car (FC05) and the dining car (BC04). In the figure, a medium voltage of 3AC 440V output by the auxiliary converters of the cars 2, 4, 5 and 7 runs throughout the entirety of the train by means of a bus-bar. Equipment supply through a power socket needs to be converted (to DC 110V/230V 50 Hz) by means of a single-phase inverter of each car. It can be seen that a voltage system of medium-voltage bus-bar on the current EMU is 60 Hz, power supply through a car power socket needs to be converted independently, which not only increases an electrical failure risk caused by the single-phase inverter, but also increases the costs of train and devices. Power supply through one wire is adopted on the current EMU, thus the requirement of arbitrary train formation cannot be satisfied; furthermore, when a power supply wire malfunctions, there is not an effective emergency measure.

SUMMARY

To solve one of the above problems, the present disclosure provides a train, which includes a train formation including a head car, a motor car, and an intermediate car.

Connectors 2 are symmetrically provided on end walls of the carriages 1 of the head car, the motor car and the intermediate car along a direction perpendicular to a direction of travel of the train, and all connectors 2 on the end walls of the train are connected by means of wiring.

The head car, the motor car and the intermediate car are connected to an electric wiring throughout an entirety of the train by means of the connectors 2 in any formation state.

The train is provided with two parallel power supply wires running throughout the entirety of the train and multiple auxiliary power supply systems.

In some optional implementations, each of the connectors 2 includes: a coding wire interface and a power supply wire interface.

One type of interface of each connector 2 is connected a same type of interfaces of other connectors 2 by means of respective wires.

In some optional implementations, the interfaces of the connectors 2 are axisymmetrically arranged on two sides of each of the end walls.

In some optional implementations, a junction box is provided in the train, and connection wires of all connectors 2 are interconnected through wire sockets on the junction box.

In some optional implementations, an encoder is provided in the train, and the encoder is configured to encode a sequence number of a car and encode a type number of the train.

In some optional implementations, the encoder includes: four output ends for outputting a sequence number of the current train and two output ends for outputting a type number of the car.

In some optional implementations, relays are provided in the carriages 1 of the motor car and the intermediate car of the train; the relays are configured to control reversing when the car is reversed 180 degrees.

The relays are connected to the auxiliary power supply system provided in the train.

In some optional implementations, the auxiliary power supply system includes: an auxiliary converter 3 and a car-mounted power box 4.

The auxiliary converter 3 is connected with two power supply wires.

The car-mounted power box 4 is connected with two power supply wires through a switching device provided in the car-mounted power box.

A voltage introduced from outside the train is adjusted, by means of the auxiliary power supply system, to 50 Hz for use by devices in the train.

To solve one of the above technical problems, the present disclosure further provides a power supply control method for the train. The method includes the following steps.

Each carriage 1 is connected to a power supply wire according to a preset wire priority.

It is determined whether a current power supply wire connected malfunctions; if the current power supply wire connected malfunctions, switch to another power supply wire.

In some optional implementations, before a power supply wire is connected to each carriage 1 according to the preset wire priority, the method includes:

a code of each carriage 1 in a current arbitrarily-marshaled train is identified, and an auxiliary converter 3 on a head car and/or a motor car is connected to two power supply wires.

In some optional implementations, if the current power supply wire connected does not malfunction, the connection of the current power supply wire is kept.

In some optional implementations, the switching is automatic switching performed by means of a train control and management system or manual switching.

In some optional implementations, before it is determined whether the current power supply wire connected malfunctions, the method includes:

a state of a network of the train is determined, and if the state is good, the power supply of the train is controlled using the train control and management system.

In some optional implementations, if the network of the train is good, the power supply of the train is controlled manually.

The beneficial effects of the present disclosure are as follows.

The technical solution of the present disclosure may ensure good connectivity of power supply wires in cases where a train is arbitrarily marshaled without being limited to the adjustment of car sequences or the reversal of cars. The solution may decrease the number of conversion devices in the EMU for converting between different voltage standards, thereby avoiding the electrical failure risk caused by using the single-phase inverter and reducing the costs of devices in the train. By designing an auxiliary power supply system topology having redundant power supply, the solution realizes train formation a variable quantity of cars and arbitrary reversal of direction of an intermediate car, and may also ensure that when a single power supply wire malfunctions, emergency measures are taken timely to switch to another power supply wire without influence on auxiliary power supply of the train.

BRIEF DESCRIPTION OF DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings.

REFERENCE SIGNS 1. carriage; 2. connector; 3. auxiliary converter; 4. car-mounted power box.

DETAILED DESCRIPTION

In order to make the technical solutions and advantages in embodiments of the present disclosure clearer, the exemplary embodiments in the present disclosure are further elaborated below in combination with the accompanying drawings. It is apparent that the described embodiments are only a part of the embodiments of the present disclosure but not all. It is to be noted that the embodiments in the present disclosure and the characteristics in the embodiments may be combined under the condition of no conflicts.

The core concept of the solution lies in: a dual-redundancy design is applied to a power supply wire of a train running throughout the entirety of the train; an encoder and a relay for controlling reversal when the train is reversed 180 degrees are used to encode the train, so that a train control and management system may identify the number and type of the current car, and then control the train according to the information; and a power supply direction of the train is set through the relay, thereby assisting in setting a running direction of each train and assisting other subsystems, and finally realizing unlimited formation and power supply of the train.

Specifically, the present disclosure provides a train. The train at least includes two head cars and an intermediate car, and the head car is a motor head car. When the train includes a head car, a motor car and an intermediate car, both the head car and the motor car may be motor type. In order to satisfy that the motor car and the intermediate car may be sequenced arbitrarily or reversed 180 degrees to form a free formation, there are connectors 2 symmetrically provided on end walls of carriages 1 of the head car, the motor car and the intermediate car along a direction perpendicular to a direction of travel of the train, and all connectors 2 on the end walls of the train are connected by means of wiring; at this point, the head car, the motor car and the intermediate car may be connected to an electric wiring throughout an entirety of the train by means of the connectors 2 in any formation state. There are two parallel power supply wires running throughout the entirety of the train and a plurality of auxiliary power supply systems provided on the train.

Figure 1:
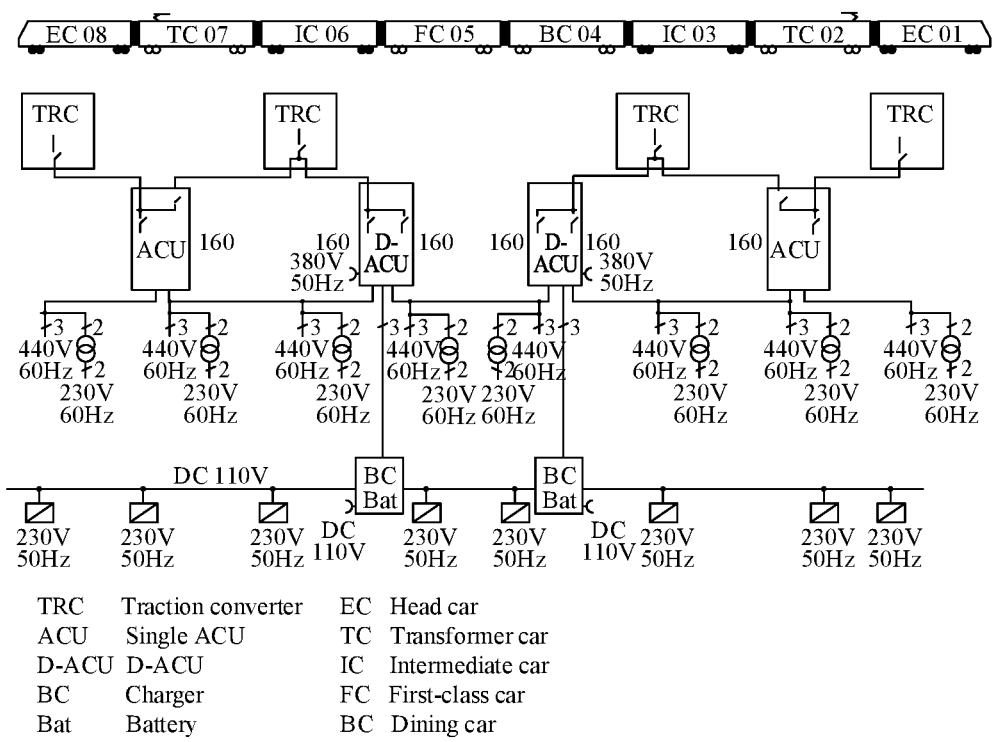
FIG. 1 is a schematic diagram of a power supply system of a train in the conventional art.
Figure 2:
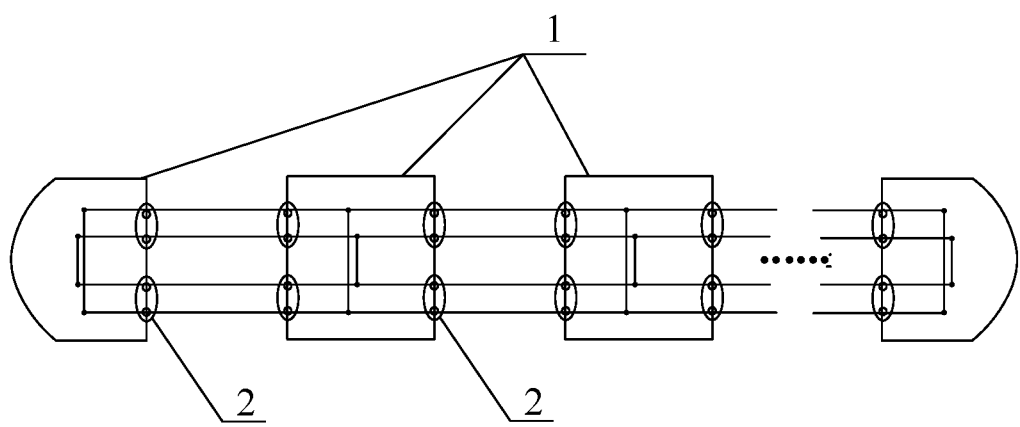
FIG. 2 is a schematic diagram of an auxiliary power supply system of a variable formation according to an embodiment of the present disclosure.

According to an embodiment of the disclosure, in order to ensure that all the wires of the train keep connected and performed correctly when the cars are sequenced arbitrarily or reversed 180 degrees to form the free formation, the connector 2 includes: a coding wire interface and a power supply wire interface. One type of interface of each connector 2 is connected with a same type of interfaces of other connectors 2 by means of respective wires. As illustrated in FIG. 2, in order to satisfy that any car of the train can be inserted in the formation and the car can be reversed 180 degrees in the formation, the interfaces on the left-side connector 2 and the interfaces on the right-side connector 2 on a same end wall are axisymmetrically arranged.

In order to realize a flexible train formation, the solution enables a train control and management system to learn the information about the number and type of the car connected. To do so, an encoder is set in each carriage 1, which is configured to encode a sequence number of the car and encode a type number of the car. In some optional implementations, in the solution, the encoder is a six-digital encoder. Four output ends in the six-digital encoder are used for outputting the sequence number of the current car, and the other two output ends are used for outputting the type number of the current car. An output and display rule of the encoder adopts a binary mode. When the formation includes 16 cars, coding is as shown in the following table.

TABLE 1

Coding Table of Train

| B0 | B1 | B2 | B3 | Sequence |
|----|----|----|----|----------|
| 0  | 0  | 0  | 1  | 1        |
| 0  | 0  | 1  | 0  | 2        |
| 0  | 0  | 1  | 1  | 3        |
| 0  | 1  | 0  | 0  | 4        |
| 0  | 1  | 0  | 1  | 5        |
| 0  | 1  | 1  | 0  | 6        |
| 0  | 1  | 1  | 1  | 7        |
| 1  | 0  | 0  | 0  | 8        |
| 1  | 0  | 0  | 1  | 9        |
| 1  | 0  | 1  | 0  | 10       |
| 1  | 0  | 1  | 1  | 11       |
| 1  | 1  | 0  | 0  | 12       |
| 1  | 1  | 0  | 1  | 13       |
| 1  | 1  | 1  | 0  | 14       |
| 1  | 1  | 1  | 1  | 15       |
| 0  | 0  | 0  | 0  | 16       |

There are two types of cars, namely a motor car or a trailer car. When a code output of the motor car is 01, the code output of the trailer car is 10. The code outputs represent the current type of the car. The encoder of the train may be set manually, or automatically set by means of a program written and embedded in the train control and management system.

According to an embodiment of the disclosure, in order to further realize the flexible formation after the car is reversed 180 degrees, there is a relay set in the carriage 1, and the relay is configured to control reversal when the train is reversed 180 degrees. The relay assists in setting the direction of travel of each car and changing power supply directions of other auxiliary systems.

Figure 3:
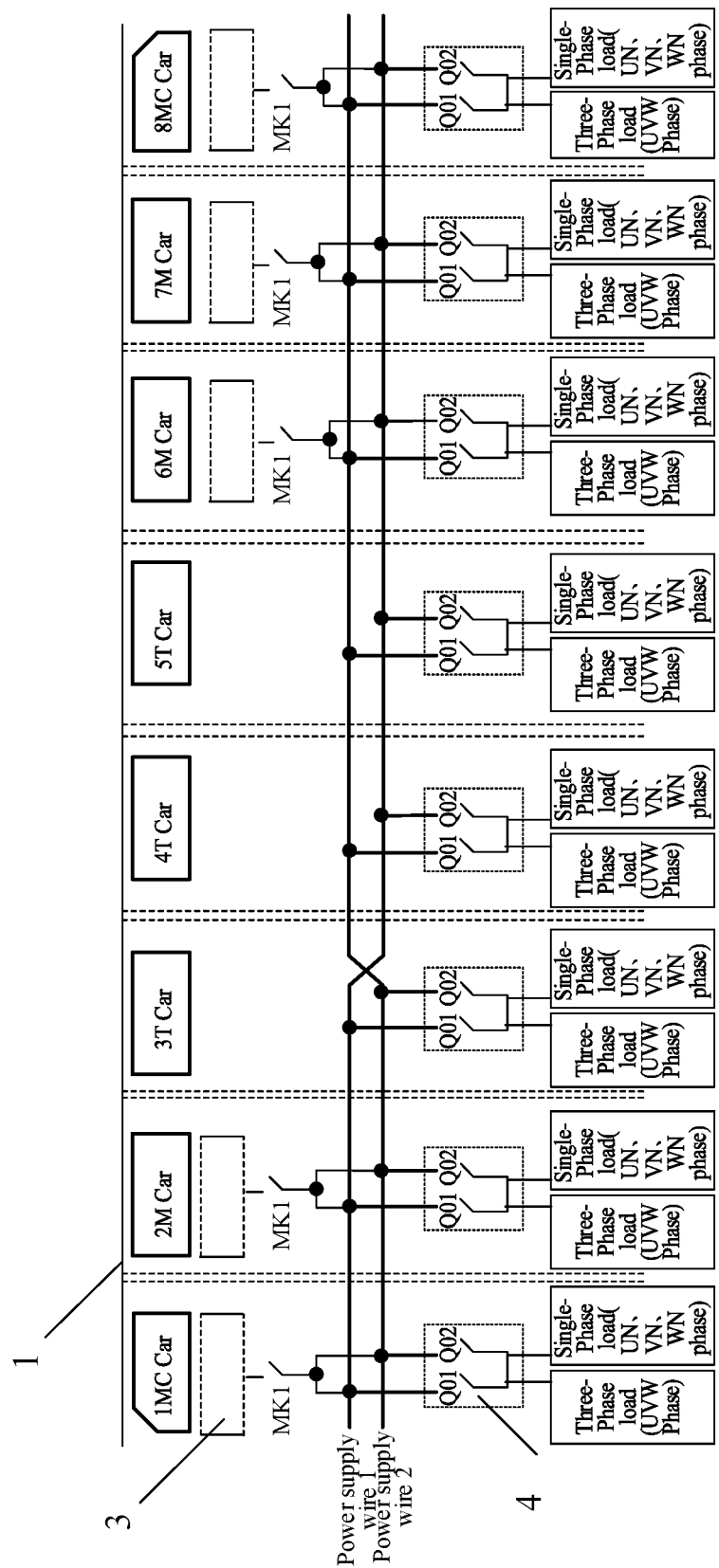
FIG. 3 is a schematic diagram of wire connection of a connector on an end wall of each carriage according to an embodiment of the present disclosure.
Figure 4:
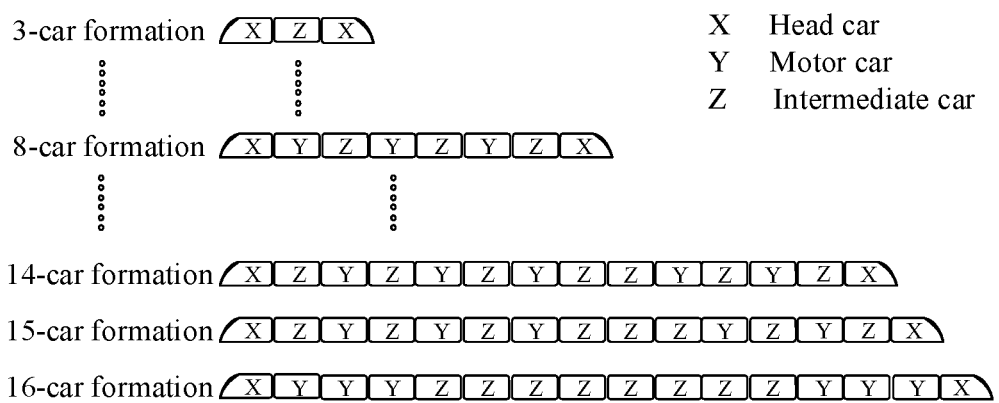
FIG. 4 is a schematic diagram of a train formation according to an embodiment of the present disclosure.
Figure 5:
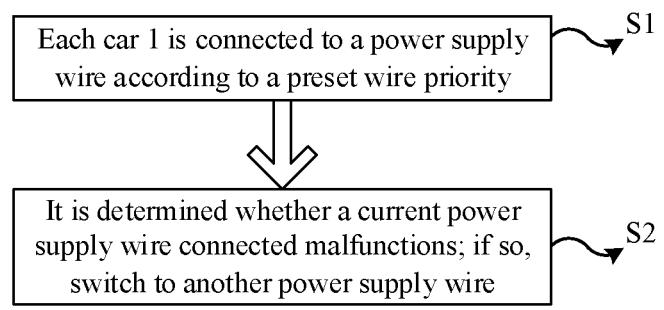
FIG. 5 is a schematic diagram of a power supply control method for a train according to an embodiment of the present disclosure.

As illustrated in FIG. 3, according to an embodiment of the disclosure, the auxiliary power supply system includes: an auxiliary converter 3 and a car-mounted power box 4. The auxiliary converter 3 is connected with two power supply wires. The car-mounted power box is connected with two power supply wires through a switching device provided in the car-mounted power box. A voltage introduced from outside the train is adjusted, by means of the auxiliary power supply system, to 50 Hz for use by devices in the train. In the present embodiment, according to a position where a powered device of the train is placed and the determined type of the carriage 1, the auxiliary converter 3 may be set on a carriage 1 where the powered device is placed or a carriage 1 which is the motor head car or the motor car. In the embodiment, there may be the auxiliary converters 3 set on all the cars. On the basis of identifying the number and type of the carriage 1 by the train control and management system, the auxiliary converters 3 in the motor head car and the motor car are connected to two power supply wires.

The embodiments of the present disclosure further provide a power supply control method for the train. The power supply control method may select the wiring of the carriage 1, and perform switching control on power supply according to the current state of the power supply wire and the network state of the train. The method includes the following specific steps.

The train control and management system is used to identify the code of each carriage 1 in the current arbitrarily-marshaled train, and connect the auxiliary converter 3 on the head car and/or the motor car to two power supply wires. After the carriage 1 is incorporated in the whole train according to the required formation sequence, the code of the head car is fixed, and the train control and management system may be directly used to identify the code. For the intermediate carriage 1, the encoder is used to code the carriage 1, and the train control and management system identifies the code of the carriage 1 to determine its number and type. After the number and type of the carriage 1 are determined, functions such as power supply, baking and alarming of the carriage 1 may be managed and controlled.

After the specific code and type of the carriage 1 are determined, the train control and management system connects the car-mounted power box 4 of the carriage 1 to a power supply wire according to a preset wire priority of each carriage 1. Preferably, the carriages 1 in all formations are connected to a same power supply wire, so that the train control and management system performs unified control conveniently. The connected wires of the carriages 1 may also be controlled separately under special circumstances.

The train control and management system performs fault determination on the power supply wire that the carriage 1 is connected at present. If the currently connected power supply wire malfunctions, switch to another power supply wire; and if the current connected power supply wire does not malfunction, the current connected state of the power supply wire is kept. According to an embodiment of the disclosure, the switching is automatic switching performed by means of the train control and management system or manual switching.

According to an embodiment of the disclosure, train control and management system also monitors the network state of the train; if the current network state of the train is good, the train control and management system is directly used to control the power supply of the train; and if the current network state of the train malfunctions, the power supply of the train is controlled manually.

The solution is further elaborated through a group of examples.

According to an embodiment of the disclosure, a high voltage is input in the auxiliary converter 3. In the present embodiment, a voltage DC 2800V is input in the auxiliary converter 3. A voltage AC 380V/50 Hz in a form of three-phase Four wire is output after inversion, filtering, voltage-drop and other processing are performed on the voltage DC 2800V. In the embodiment, as illustrated in FIG. 3, the auxiliary converter 3 has two capacities, namely 100 KVA and 230 KVA with a power factor of 0.85, which are respectively in the head cars (the cars 1 and 8, 100 KVA turns out to be 85 KW) and the intermediate motor cars (the cars 2, 6 and 7, 230 KVA turns out to be 200 KW). The total capacity of the auxiliary converters 3 in the whole train is 890 KVA, and the power turns out to be 757 KW.

TABLE 1

AC load calculation of variable formation

| Serial number | MC | | | M | | | T | | AC load calculation | |
|---|---|---|---|---|---|---|---|---|---|---|
| | | | | | | | | | Power of whole train | Load of whole train |
| | Power | Load | Quantity | Power | Load | Quantity | Load | Quantity | | |
| 1 | 85 | 112 | 2 | 200 | 87 | 1 | 62 | 1 | 370 | 373 |
| 2 | 85 | 112 | 2 | 200 | 87 | 2 | 62 | 2 | 570 | 522 |
| 3 | 85 | 112 | 2 | 200 | 87 | 3 | 62 | 2 | 770 | 609 |
| 4 | 85 | 112 | 2 | 200 | 87 | 4 | 62 | 4 | 970 | 820 |
| 5 | 85 | 112 | 2 | 200 | 87 | 5 | 62 | 5 | 1170 | 969 |
| 6 | 85 | 112 | 2 | 200 | 87 | 6 | 62 | 8 | 1370 | 1242 |

According to statistical calculation of a load power, the maximum AC load of the motor head car, namely the MC car, is 112 KW; the maximum AC load of the motor car, namely the M car, is 87 KW; and the maximum AC load of the intermediate car, namely the T car, is 62 KW. Thus, the formation number may be adjusted arbitrarily according to the power and load of the auxiliary converter 3.

As illustrated in FIG. 3, the auxiliary converter 3 in each motor car forms a two three-phase four-wire bus-bars, namely the power supply wire 1 and the power supply wire 2, through an output contactor MK1, thereby realizing uninterrupted power supply to the three-phase bus-bars of the whole train. When the network state is good, the train control and management system may directly control the output contactor MK1 to connect the auxiliary converter 3 to the power supply wire or disconnect the auxiliary converter 3 from the power supply wire. When the network malfunctions, the output contactor MK1 may be controlled manually. The two three-phase AC bus-bars run in parallel to supply power for a three-phase load and a single-phase load through the contactor Q01 (which is closed during power supply through the power supply wire I) or the contactor Q02 (which is closed during power supply through the power supply wire II) in the car-mounted power box 4.

As illustrated in FIG. 3, the three-phase load adopts the U-phase power supply, the V-phase power supply and the W-phase power supply in the car-mounted power box 4 to provide the power supply of 3AC380V/50 Hz for a charger, a cooling fan, an air conditioner, an air compressor and other loads.

The single-phase load adopts the power supply of each phase, namely the UN-phase power supply, the VN-phase power supply and the WN-phase power supply, in the car-mounted power box 4 to provide the power supply of AC220V/50 Hz for a sanding device, kitchen appliance, a socket and other loads.

When a switch set in the car-mounted power box 4 of each carriage 1 is at an automatic position, the on/off state of the switch in the car-mounted power box 4 may be controlled by the train control and management system, so as to implement selection of the power supply wire; furthermore, it is possible to manually select through a change-over switch to close the power supply contactor (Q01 or Q02) in the car-mounted power box 4, so as to implement selection of the power supply wire I or the power supply wire II.

Due to the setting of the redundancy connectors 2 on the end wall, arbitrary sequencing of cars and formation of cars reversed 180 degrees may be realized, and the number and type of the current carriage 1 are determined by receiving a signal from the train control and management system, so the connection of the dual-redundancy power supply wire when the train formation is variable may be satisfied, and the bus-bar required to provide power supply may be automatically selected according to the number of the current carriage 1. For example, in cases where the motor car No. 2 is in an original working condition, the power supply contactor Q01 is closed, and the power supply wire I is connected to provide supply power. When the motor car No. 2 is reversed 180 degrees, the state of the current car is determined by the train control and management system, the contactor Q02 is selected to be closed according to the connection priority of the power supply wire of the current carriage 1, and the power supply wire II is connected to provide supply power. If the power supply wire II that the motor car No. 2 is connected malfunctions, the power supply contactor Q01 is closed by the train control and management system or directly closed manually, the power supply contactor Q02 is disconnected, and the power supply wire I is connected to provide supply power.

The whole AC load power supply system adopts two three-phase four-wire AC bus-bars running throughout the entirety of the train, so as to ensure the redundancy in power supply of the three-phase AC bus-bars and loads. Furthermore, controlling the contactor through an AC bus-bar change-over switch and the train control and management system satisfies the switching between the power supply wire I and the power supply wire II, thereby realizing train formation of a variable quantity of cars of EMU and arbitrary reversal of direction of an intermediate car.

The solution may realize AC auxiliary power supply of the train based on the variable formation. An output voltage standard is 50 Hz, and a single-phase AC voltage 220V/50 Hz may be formed with the wire N through each phase. One single-phase inverter of each car is reduced, that is to say, the technical risk caused by conversion between different voltage standards of the EMU is decreased and the cost of devices is reduced. Moreover, the design of an auxiliary power supply control system of redundancy in power supply, namely two three-phase four-wire AC bus-bars may realize the 180-degree reversal of any single car, which reduces the difficulty of operating and maintaining a formation operation. The formation of a variable quantity of cars in the whole train realizes the flexible formation according to a transport volume requirement.

It is apparent that those skilled in the art may make various modifications and changes to the present disclosure without departing from departing from its spirit and scope. If these modifications and variations of the present disclosure belong to the scope of the claims of the present disclosure and its equivalent technology, the present disclosure is intended to include these modifications and variations.

The invention claimed is:

1. A train, comprising: a train formation including a head car, a motor car and an intermediate car,
    wherein connectors are symmetrically provided on end walls of carriages of the head car, the motor car and the intermediate car along a direction perpendicular to a direction of travel of the train, and all connectors on the end walls of the train are connected by means of wiring;
    the head car, the motor car and the intermediate car are connected to an electric wiring throughout an entirety of the train by means of the connectors in any formation state; and
    the train is provided with two parallel power supply wires running throughout the entirety of the train and a plurality of auxiliary power supply systems,
    wherein an encoder is provided in the train, and the encoder is configured to encode a sequence number of a car and encode a type number of the car, and
    the auxiliary power supply system comprises an auxiliary converter, wherein the auxiliary converters is set on all the cars, and based on identifying the sequence number and a type of the car by a train control and management system, the auxiliary converters in a motor head car and the motor car are connected to the two parallel power supply wires, and wherein the type of the car at least comprises: the motor head car, the motor car, and a trailer car.

2. The train of claim 1, wherein each of the connectors comprises: a coding wire interface and a power supply wire interface;
    one type of interface of each connector is connected with a same type of interfaces of other connectors by means of respective wires.

3. The train of claim 2, wherein the interfaces of the connectors are axisymmetrically arranged on two sides of each of the end walls.

4. The train of claim 3, wherein a junction box is provided in the train, and connection wires of all connectors are interconnected through wire sockets on the junction box.

5. The train of claim 1, wherein the encoder comprises: four output ends for outputting the sequence number of the car and two output ends for outputting the type number of the car.

6. The train of claim 1, wherein relays are provided in the carriages of the motor car and the intermediate car of the train; the relays are configured to control reversing when the car is reversed 180 degrees;
    the relays are connected to the auxiliary power supply system provided in the train.

7. The train of claim 1, wherein the auxiliary power supply system comprises a car-mounted power box;
    the car-mounted power box is connected with two power supply wires through a switching device provided in the car-mounted power box;
    a voltage introduced from outside the train is adjusted, by means of the auxiliary power supply system, to 50 Hz for use by devices in the train.

8. A power supply control method for a train, the train comprising a train formation including a head car, a motor car and an intermediate car, wherein connectors are symmetrically provided on end walls of carriages of the head car, the motor car and the intermediate car along a direction perpendicular to a direction of travel of the train, and all connectors on the end walls of the train are connected by means of wiring; the head car, the motor car and the intermediate car are connected to an electric wiring throughout an entirety of the train by means of the connectors in any formation state; and the train is provided with two parallel power supply wires running throughout the entirety of the train and a plurality of auxiliary power supply systems, the method comprising:
    connecting each carriage to a power supply wire according to a preset wire priority;
    determining whether a current power supply wire connected malfunctions, and if the current power supply wire connected malfunctions, switching to another power supply wire,
    wherein the method further comprises: before connecting each car to the power supply wire according to the preset wire priority,
    identifying a code of each carriage in a current arbitrarily-marshaled train, and connecting an auxiliary converter in a motor head car and the motor car to the two parallel power supply wires, wherein the code of the carriage comprises a sequence number of a car and a type number of the car, and a type of the car indicated by the type number comprises: the motor head car, the motor car, and a trailer car.

9. The power supply control method of claim 8, wherein if the current power supply wire connected does not malfunction, keeping the connection of the current power supply wire.

10. The power supply control method of claim 9, wherein the switching is automatic switching performed by means of a train control and management system or manual switching.

11. The power supply control method of claim 9, further comprising: before determining whether the current power supply wire connected malfunctions,
    determining a state of a network of the train, and if the state is good, controlling power supply of the train using the train control and management system.

12. The power supply control method of claim 8, wherein the switching is automatic switching performed by means of a train control and management system or manual switching.

13. The power supply control method of claim 8, further comprising: before determining whether the current power supply wire connected malfunctions,
    determining a state of a network of the train, and if the state is good, controlling power supply of the train using the train control and management system.

14. The power supply control method of claim 13, wherein if the network of the train malfunctions, controlling manually the power supply of the train.

15. The power supply control method of claim 8, wherein the switching is automatic switching performed by means of a train control and management system or manual switching.

16. The power supply control method of claim 8, further comprising: before determining whether the current power supply wire connected malfunctions,
    determining a state of a network of the train, and if the state is good, controlling power supply of the train using the train control and management system.

* * * * *